May 22, 1945. O. S. DE CAUSSE 2,376,329
SELF LOCKING HIGH SHEAR RIVET
Filed Sept. 13, 1943
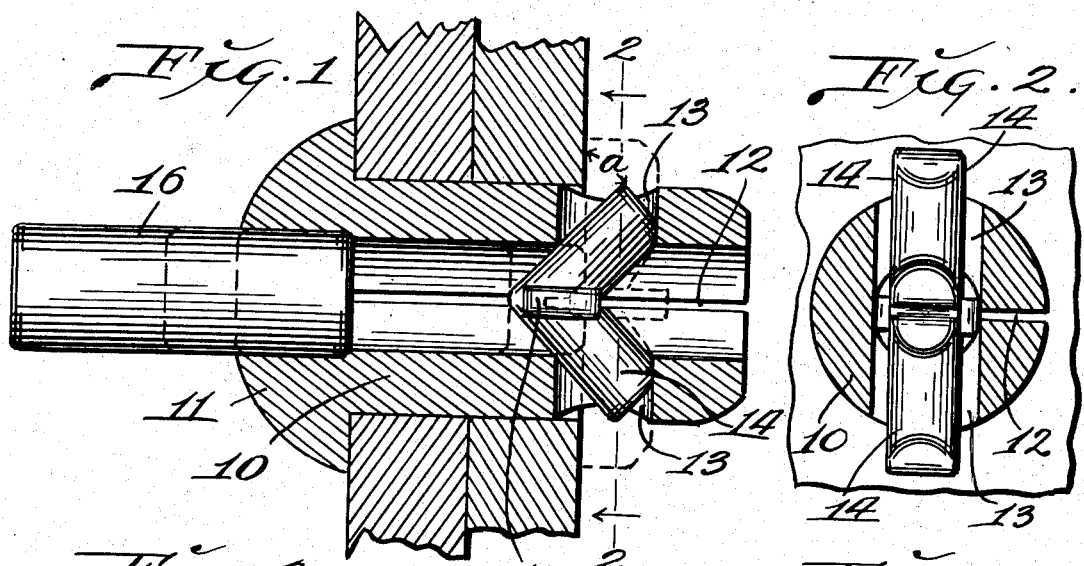
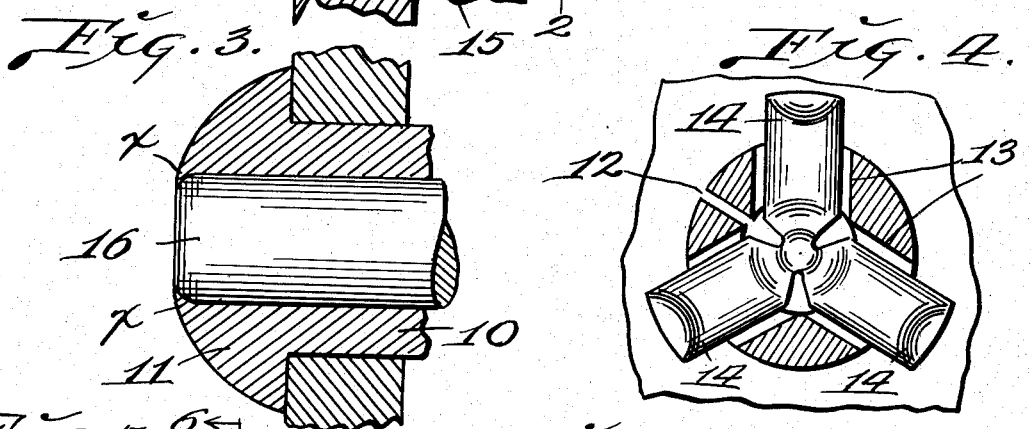
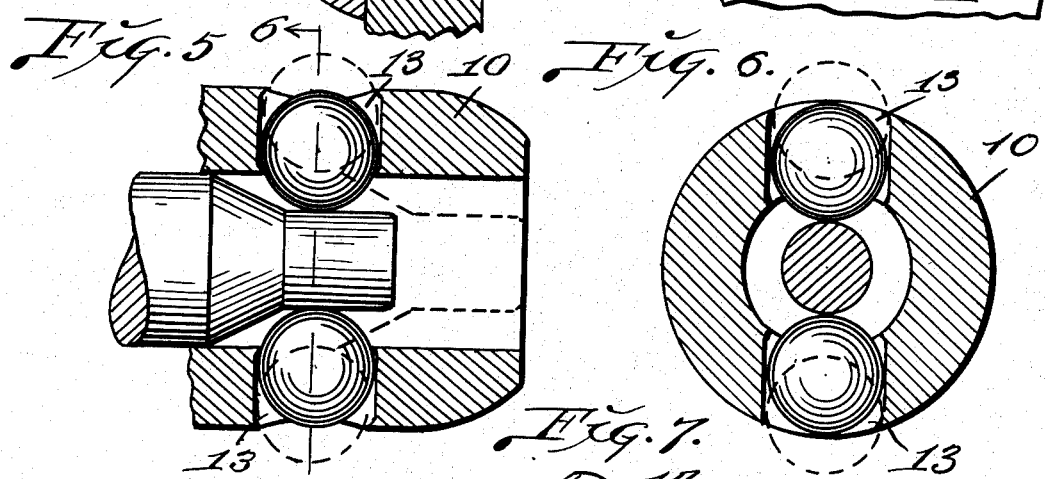
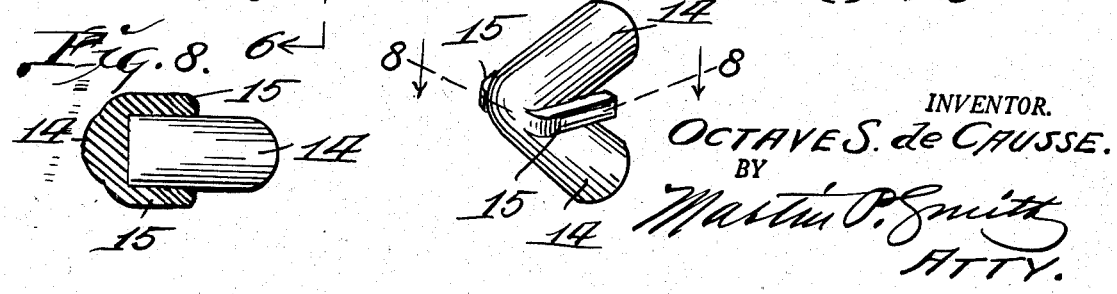
INVENTOR.
OCTAVE S. de CAUSSE.
BY
Martin P. Smith
ATTY.

Patented May 22, 1945

2,376,329

UNITED STATES PATENT OFFICE 2,376,329

SELF-LOCKING HIGH-SHEAR RIVET

Octave S. de Causse, Hollywood, Calif.

Application September 13, 1943, Serial No. 502,146

1 Claim. (Cl. 85—40)

My invention relates to a self-locking high-shear rivet for use in the assembly of plates or other parts and particularly, where there is difficulty or impossibility of access on one side of the work for the use of the bucking-up tools which are necessary in the application of conventional rivets.

While there appears to be a considerable demand, particularly in the aircraft industry, for rivets of very great shearing strength, conventional rivets are limited in this respect, by the ability of the metal of which they are made, to be readily crushed or upset for forming the second head and expanding the shank to fill the rivet hole.

This is particularly true of aluminum alloy rivets and although their mechanical properties have been considerably improved by special heat treatments, their use is hampered by such costly and bothersome practices as re-heat treatment, cold storage of the rivets before driving, and so forth.

I believe that the answer to this problem is a rivet made of high tensile metal which can be locked within the hole, without upsetting of the metal, by means of a mechanical locking device, mechanical means being also provided for expanding the rivet shank to fill the rivet hole.

Such a rivet could also advantageously replace bolts in highly stressed aircraft parts, where conventional rivets cannot give the required shearing strength, and would have the advantage of filling the assembly holes much better than bolts, thus assuring a greater resistance of the assembly to vibration and fatigue.

Additional advantages would be, lower cost, far greater speed in application, elimination of the danger of stripped threads, and the like.

The principal objects of my invention are, to generally improve upon and simplify the construction of the existing forms of blind rivets, further, to provide, a self-locking high-shear rivet consisting of a tubular rivet member, preferably slotted, comporting a locking device at its inner or rear end and further, to provide simple and effective means for operating said locking device and expanding the rivet body, so as to very rigidly set same in the rivet hole and thus provide an inexpensive connection of great shearing strength and solidity.

Even when both sides of the work are accessible, it is practical to apply my improved rivet from one side only of the part or parts to be riveted, thus saving the services and expense of a bucker or second operator and, in addition, saving time, by avoiding the usual necessary coordination and signaling between the two operators.

A further saving of time, labor and other expense may be effected as a result of ease and rapidity of rivet application, as there is no metal or material to crush or upset in filling the rivet hole and forming the second head and further, for the reason that a hand hammer may be used for applying the rivet, instead of costly and expensive to operate air hammers or riveting guns, or, as for certain currently existing blind rivets, elaborate and costly applying devices.

Inasmuch as my rivet requires no crushing, it may be made of very high tensile metals or materials, thus imparting to it very high shearing strength, coupled with satisfactory tensile strength, whereas such metals or materials cannot be used in ordinary rivets, particularly for the cold riveting of relatively soft metal parts.

With the foregoing and other objects in view, my invention consists in certain novel features of construction and arrangement of parts which will be hereinafter more fully described and claimed and illustrated in the accompanying drawing in which:

Fig. 1 is a section taken lengthwise through the center of my improved rivet, showing same positioned in a rivet hole, with a two branch locking element in contracted or open position for introduction into the rivet hole and the operating pin, before being driven through the rivet body, with dotted lines showing the operating pin in intermediate and final positions and the locking element in expanded or locked position.

Fig. 2 is a cross section taken on the line 2—2 of Fig. 1 and showing the locking element in expanded or locked position.

Fig. 3 is a section through the head portion of the rivet and showing the core or operating pin locked in the rivet.

Fig. 4 is a cross section similar to Fig. 2 and showing a three branch locking element in expanded or locked position.

Fig. 5 is a fragmentary longitudinal section through the center of the rivet with a modified form of locking device, with same shown in open position (full lines) and locked position (dotted lines), also showing a corresponding type of operating pin.

Fig. 6 is a cross section taken on the line 6—6 of Fig. 5.

Fig. 7 is a perspective view of the form of locking element used in connection with the rivet illustrated in Fig. 1.

Fig. 8 is a cross section taken on the line 8—8 of Fig. 7.

In accordance with my invention the rivet is composed essentially of three parts (one) a tubular body resembling a tubular rivet with a relatively thick wall and integral head on one end, (two) a locking element located within said tubular body near its rear end, and (three) an operating pin which may be generally cylindrical in shape, as in Fig. 1, or provided with a tapered portion as illustrated in Fig. 5.

Referring by numerals to the accompanying drawing, 10 designates the tubular shank of the rivet, 11 a head of any desired size and shape on one end, said shank being slotted lengthwise as designated by 12, from or near head 11 to the rear end of said shank.

Formed through the rear portion of the shank 10, at approximately right angles to its axis and intersecting the bore through said shank are holes 13.

In Figs. 1 and 2 the shank is shown provided with two holes and in Fig. 4, with three holes.

The locking element 14 has one or more branches which, when contracted or folded into angular positions, as shown by full lines in Fig. 1, do not project beyond the shank diameter, thus permitting the ready introduction of the rivet into the rivet hole. When, however, this locking element is expanded or straightened out as shown by dotted lines in Fig. 1, its branches extend considerably beyond the rivet shank and thus lock the rivet, preventing it from coming out again and, at the same time, pressing or clinching the plates together, through the direction of their travel while being expanded, as shown at $a$ in Fig. 1.

In order to support the locking element in proper position when inserted in the openings 13, small lugs 15 are formed on the side faces of the element at or near the center thereof and which lugs are adapted to contact the face of the bore through the rivet shank. With a locking element comporting more than two branches, these lugs are unnecessary.

The expansion of the locking element 14 is obtained by the action of a core or pin 16 driven through the tubular member, which it expands at the same time, filling the rivet hole completely and thus providing an extremely tight riveting job, capable of resisting high stresses and fatigue effects.

The rear end of this operating pin 16, when same is driven in, presses against the folded or contracted locking element and flattens same, thus causing its branches to extend beyond the rivet shank, and securely lock the rivet in the work.

The locking element branches may be round, half-round, rectangular or of any desired shape and should be made of high tensile metal, as the tensile strength of the rivet depends upon the shearing strength of same.

In order to provide a good expansion of the rivet body, without much force having to be applied, I prefer to slot the tubular shank 10 longitudinally from the rear end up to the annular head 11, the pin being made slightly oversize with respect to the interior bore of the rivet, but in small rivets having light wall thicknesses, satisfactory expansion of the shank can be obtained without slotting same.

In Fig. 1 it will be noted that the internal diameter of the slotted portion of the rivet shank is slightly smaller than the diameter of the pin 16 and the diameter of the opening through the rivet head, such construction insuring expansion of the rivet shank in the rivet hole when the pin is driven into said shank.

In order to present my improved rivet as a single rivet-unit, the operating pin may be set into the annular head with a sliding fit, as shown in Fig. 1, during rivet fabrication, said head being counterbored to practically pin diameter, thus limiting the body expansion to the rivet shank when the pin is driven in.

To avoid counterboring the head in order to facilitate fabrication and also, to obtain a more perfect filling of the rivet hole when the shank is expanded, I prefer to make the rivet O. D. to hole size, or slightly oversize, and the inner bore, to pin diameter and then contract the shank slightly, thus enabling the rivet to be positioned as easily as a conventional rivet with no precision drilling required, and when expanded by the pin the shank regains its original O. D., thus filling the hole perfectly, with a minimum opening of the slot.

The operating pin should be made of high tensile metal or material, preferably the same as the tubular member, in order to give maximum shearing strength and its ends should be rounded off, the inner end to facilitate the rivet body expansion and the outer end to prevent flaring under hammering and for the locking arrangement hereafter explained.

When the locking element has been fully expanded, the rounded outer end of the operating pin should be positioned approximately flush with the outer face of the annular rivet head and the operating pin can then be effectively anchored in the tubular member of the rivet and prevented from coming out, as a result of vibration or fatigue, by slightly peening the edge of the rivet head over the end of the operating pin as designated by Fig. 3.

This peening or riveting action may be accomplished automatically when driving in the pin, and just after the outer end of same has passed the edge of the annular rivet head.

In the case of countersunk heads for flush riveting, it is advisable to provide a little extra metal for the peening operation, in the form of a central lip or rib on the face of the rivet head.

The operating pin cannot come out of the rear end of the rivet due to the presence of the locking element.

Once set, the rivet is securely and permanently locked, as the locking element cannot be returned to its contracted or open position as long as the operating pin is in place and it shearing strength is equivalent to that of a solid rivet made of the same material.

When the parts to be assembled are made of relatively soft metals or materials, the modified form of locking device shown in Fig. 5 can be used to advantage.

Two or more balls, or other suitable elements, are positioned within the rear end of the rivet and, in open position, do not project beyond the diameter of the shank, and are prevented from falling out by peening the inner and outer edges of the drilled holes. When the conical part of the operating pin reaches the balls, these protrude from the rivet shank and are forced behind the last part to be assembled or into said part, if the rivet is positioned into a blind hole in the last part, thus holding the assembled parts firmly together.

The present trend, particularly in aircraft riveting, being towards increased rivet shearing strength, with minor interest being accorded to tensile strength, it will be found that my improved rivet has very definite possibilities, affording, as it does, very high shearing strength through the use of high tensile materials in its manufacture, and having a very satisfactory tensile strength, which is equal to the total shearing strength of all the locking element branches.

All rivets embodying my invention may be made with any desired shape of head and from any suitable metal or material.

Thus it will be seen that I have provided a rivet which is simple in structure, inexpensive in manufacture, and very effective in performing the functions for which it is intended.

It will be understood that minor changes in the size, form and construction of the various parts of my improved rivet may be made and substituted for those herein shown and described without departing from the spirit of the invention, the scope of which is set forth in the appended claim.

I claim as my invention:

In a rivet formed of hard material, the combination with a tubular body having an integral head on one end and there being apertures formed through the wall of said rivet body adjacent the other end, of a separately formed one piece expansible member positioned wholly within said rivet body adjacent said apertures and having angularly disposed portions connected at their inner ends by a deformable member and with their outer portions positioned within the apertures in said tubular body.

OCTAVE S. DE CAUSSE.